United States Patent
Pan et al.

(10) Patent No.: US 9,214,284 B2
(45) Date of Patent: Dec. 15, 2015

(54) DECOUPLING DEVICE WITH THREE-DIMENSIONAL LEAD FRAME AND FABRICATING METHOD THEREOF

(71) Applicant: Industrial Technology Research Institute, Hsinchu (TW)

(72) Inventors: Yi-Hsiu Pan, Nantou County (TW); Yu-Ting Cheng, Hsinchu (TW); Li-Duan Tsai, Hsinchu (TW); Chi-Lun Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 394 days.

(21) Appl. No.: 13/743,327

(22) Filed: Jan. 16, 2013

(65) Prior Publication Data
US 2014/0071591 A1    Mar. 13, 2014

(30) Foreign Application Priority Data
Sep. 13, 2012 (TW) ............................. 101133539 A

(51) Int. Cl.
*H01G 9/012* (2006.01)
*H01G 9/042* (2006.01)
(Continued)

(52) U.S. Cl.
CPC .............. *H01G 9/012* (2013.01); *H01G 9/048* (2013.01); *H01G 9/0425* (2013.01); *H01G 9/26* (2013.01); *H01R 43/00* (2013.01); *Y10T 29/49208* (2015.01)

(58) Field of Classification Search
CPC ........... H01G 9/012; H01G 9/15; H01G 9/26; H01G 9/0425; H01G 9/048
See application file for complete search history.

(56) References Cited

U.S. PATENT DOCUMENTS

| | | | |
|---|---|---|---|
| 4,675,790 A | 6/1987 | DeMatos et al. | |
| 4,959,754 A * | 9/1990 | Stufler et al. | 361/527 |

(Continued)

FOREIGN PATENT DOCUMENTS

| | | |
|---|---|---|
| CN | 101517676 | 8/2009 |
| CN | 102074382 | 5/2011 |

(Continued)

OTHER PUBLICATIONS

Masuda et al, "A Line Structure Component Using a Conducting Polymer," Electronics and Communications in Japan, Part 2, 86 (7), Jun. 2003, pp. 23-31.

(Continued)

*Primary Examiner* — David M Sinclair
(74) *Attorney, Agent, or Firm* — Jianq Chyun IP Office

(57) ABSTRACT

A decoupling device including a lead frame and at least one capacitor unit set is provided. The lead frame includes a cathode terminal portion and at least two anode terminal portions disposed at two sides of the cathode terminal portion and opposite to each other. The anode terminal portions are electrically connected through a conductive line. One of the anode terminal portions extends along a first direction to form an extending portion, and the extending portion is bended along a second direction perpendicular to the first direction to form an anode side plate. Each capacitor unit set includes a plurality of capacitor units. The capacitor unit sets are connected in parallel on a same plane and disposed on the lead frame. Each capacitor unit has a cathode portion electrically connected to the cathode terminal portion and an anode portion electrically connected to the anode side plate along the first direction.

18 Claims, 15 Drawing Sheets

(51) Int. Cl.
*H01G 9/048* (2006.01)
*H01G 9/26* (2006.01)
*H01R 43/00* (2006.01)

(56) References Cited

U.S. PATENT DOCUMENTS

| | | | |
|---|---|---|---|
| 5,184,287 A | 2/1993 | Taniguchi | |
| 6,646,523 B2 | 11/2003 | Arai et al. | |
| 6,717,793 B2 | 4/2004 | Arai et al. | |
| 6,741,451 B2 | 5/2004 | Aoyama | |
| 6,816,358 B2 * | 11/2004 | Kida et al. | 361/540 |
| 6,836,195 B2 | 12/2004 | Arai et al. | |
| 6,911,880 B2 | 6/2005 | Arai et al. | |
| 6,977,807 B2 | 12/2005 | Arai et al. | |
| 7,005,944 B2 | 2/2006 | Arai et al. | |
| 7,031,141 B2 | 4/2006 | Kuriyama | |
| 7,057,882 B2 | 6/2006 | Fujii et al. | |
| 7,061,772 B2 | 6/2006 | Arai et al. | |
| 7,215,533 B2 | 5/2007 | Kurita et al. | |
| 7,247,178 B2 * | 7/2007 | Hirano et al. | 29/25.03 |
| 7,352,563 B2 | 4/2008 | Pelcak et al. | |
| 7,612,987 B2 * | 11/2009 | Kurita et al. | 361/523 |
| 2005/0000071 A1 * | 1/2005 | Huntington | 29/25.42 |
| 2008/0158782 A1 * | 7/2008 | Cheng et al. | 361/524 |
| 2009/0073639 A1 * | 3/2009 | Ishizuka et al. | 361/523 |
| 2010/0073848 A1 * | 3/2010 | Kobayashi et al. | 361/528 |
| 2010/0214038 A1 * | 8/2010 | Kurita et al. | 333/185 |
| 2011/0157775 A1 | 6/2011 | Cheng et al. | |
| 2011/0216475 A1 | 9/2011 | Chiu et al. | |
| 2012/0162852 A1 * | 6/2012 | Cheng et al. | 361/301.4 |

FOREIGN PATENT DOCUMENTS

| | | | |
|---|---|---|---|
| JP | 01037006 A * | 2/1989 | |
| JP | 6120088 | 4/1994 | |
| JP | 200632880 | 2/2006 | |
| JP | 2006156951 A * | 6/2006 | |
| JP | 2007012828 A * | 1/2007 | |
| JP | 2007-59854 | 3/2007 | |
| JP | 2007-116064 | 5/2007 | |
| JP | 2007-180327 | 7/2007 | |
| JP | 2007-180328 | 7/2007 | |
| JP | 2007-258456 | 10/2007 | |
| JP | 2008-21771 | 1/2008 | |
| JP | 2008-21772 | 1/2008 | |
| JP | 2008-21773 | 1/2008 | |
| JP | 2008-21774 | 1/2008 | |
| JP | 2008-53416 | 3/2008 | |
| JP | 2008-078370 | 4/2008 | |
| JP | 2008-103447 | 5/2008 | |
| JP | 2008-135424 | 6/2008 | |
| JP | 2008-135425 | 6/2008 | |
| JP | 2008-177195 | 7/2008 | |
| JP | 2008300738 A * | 12/2008 | |
| JP | 2009-21355 | 1/2009 | |
| JP | 2010027900 A * | 2/2010 | |
| JP | 2010226139 A * | 10/2010 | |
| TW | 200641939 | 12/2006 | |
| TW | 200828370 | 7/2008 | |
| TW | I320191 | 2/2010 | |
| TW | 201227770 | 7/2012 | |
| WO | WO 2010023990 A1 * | 3/2010 | |

OTHER PUBLICATIONS

Prymak et al., "Decoupling Solutions," Proceedings CARTS USA 2008, 28th Symposium for Passive Electronics, Mar. 2008, pp. 1-10.

Shimo Akitoshi, "The Proadlizer for the Next-Generation Notebook and Desktop PCs," NEC Technical Journal 4(1), Mar. 2009, pp. 67-70.

Nogami et al., "The effects of hyperbranched poly(siloxysilane)s on conductive polymer aluminum solid electrolytic capacitors," Journal of Power Sources 166 (2), Apr. 2007, pp. 584-589.

* cited by examiner

DECOUPLING DEVICE WITH THREE-DIMENSIONAL LEAD FRAME AND FABRICATING METHOD THEREOF

CROSS-REFERENCE TO RELATED APPLICATION

This application claims the priority benefit of Taiwan application serial no. 101133539, filed on Sep. 13, 2012. The entirety of the above-mentioned patent application is hereby incorporated by reference herein and made a part of this specification.

BACKGROUND

1. Technical Field

The disclosure relates to a decoupling device. Particularly, the disclosure relates to a decoupling device having a better process yield and a fabricating method thereof.

2. Related Art

Since a solid electrolytic capacitor has advantages of small size, high capacitance and a superior frequency characteristic, etc., it is adapted to be used in a decoupling function of a power circuit of a central processing unit (CPU).

Generally, a plurality of capacitor units can be stacked on a planar lead frame to form the solid electrolytic capacitor having a high capacitance, so as to implement as a decoupling device in the power circuit of the CPU. In an actual application, each of the vertically stacked capacitor units includes an anode portion and a cathode portion. All of the cathode portions are electrically connected to each other through a conductive adhesive. Moreover, all of the anode portions are pulled-down or bended to be electrically connected to anode terminal portions located at a same plane of the planar lead frame, and the anode portions are connected to each other through multiplayer co-welding.

However, since the anode and the cathode of the decoupling device have a great difference in thickness during fabrication, the anode is probably broken due to thermal stress of multiplayer co-welding anode portions, which may lead to decrease of an effective capacitance. Moreover, if an area of a solder joint is small, the solder joint is easily oxidized and insulated, which may cause decrease of an effective number of connections, and also lead to decrease of an effective capacitance.

Therefore, how to improve a process yield of the decoupling device is an important issue to be studied.

SUMMARY

The disclosure provides a decoupling device including a lead frame and at least one capacitor unit set. The lead frame includes a cathode terminal portion and at least two anode terminal portions. The at least two anode terminal portions are disposed at two sides of the cathode terminal portion and are opposite to each other. The anode terminal portions are electrically connected to each other through a conductive line, where one of the anode terminal portions extends outwards along a first direction to form an extending portion, and the extending portion of the anode terminal portion is bended along a second direction to form an anode side plate, where the first direction is perpendicular to the second direction. The at least one capacitor unit set includes a plurality of capacitor units. The capacitor unit sets are electrically connected to each other in parallel on a same plane and are disposed on the lead frame, and the capacitor units included in each of the capacitor unit sets are arranged along the second direction in a stacking manner, and each of the capacitor units has a cathode portion and an anode portion, the cathode portion is electrically connected to the cathode terminal portion, and the anode portion is electrically connected to the anode side plate along the first direction.

The disclosure provides a three-dimensional lead frame, adapted to carry at least one capacitor unit set, and includes a cathode terminal portion, a conductive line and at least two anode terminal portions. The cathode terminal portion has a space. The conductive line is disposed in the space. The at least two anode terminal portions are disposed at two sides of the cathode terminal portion and opposite to each other, and are electrically connected to each other through the conductive line, where one of the anode terminal portions extends outwards along a first direction to form an extending portion, and the extending portion of the anode terminal portion is bended along a second direction to form an anode side plate, where the first direction is perpendicular to the second direction.

The disclosure provides a method for fabricating a decoupling device, which includes following steps. A lead frame and at least one capacitor unit set are provided. The lead frame includes a cathode terminal portion and at least two anode terminal portions disposed at two sides of the cathode terminal portion and opposite to each other. The anode terminal portions are electrically connected to each other through a conductive line, where at least one of the anode terminal portions extends outwards along a first direction to form an extending portion, and the extending portion of the anode terminal portion is bended along a second direction to form an anode side plate, where the first direction is perpendicular to the second direction. The capacitor unit set includes a plurality of capacitor units. The capacitor unit sets are electrically connected to each other in parallel on a same plane and are disposed on the lead frame, and the capacitor units are arranged along the second direction in a stacking manner, and each of the capacitor units has a cathode portion and an anode portion opposite to each other, the cathode portion is electrically connected to the cathode terminal portion, and the anode portion is electrically connected to the anode side plate along the first direction.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

A decoupling device of the disclosure uses a plurality of capacitor units that are connected in parallel in a staking manner, which has a simple fabrication process and a low equivalent series resistance (ESR).

At least two anode terminal portions of a lead frame of the disclosure are connected to each other to form a transmission line structure, and the transmission line structure would be formed as an inductor at a high-frequency state, which may constitute a filter with the capacitor units.

The lead frame of the disclosure has a plurality of terminal structures, and a current transmission distance between adjacent terminals is shortened to decrease an equivalent series inductance (ESL).

The disclosure provides a three-dimensional lead frame with a cathode and an anode side plates to be applied in a high frequency decoupling device, and several exemplary embodiments are provided below for descriptions.

Figure 1:
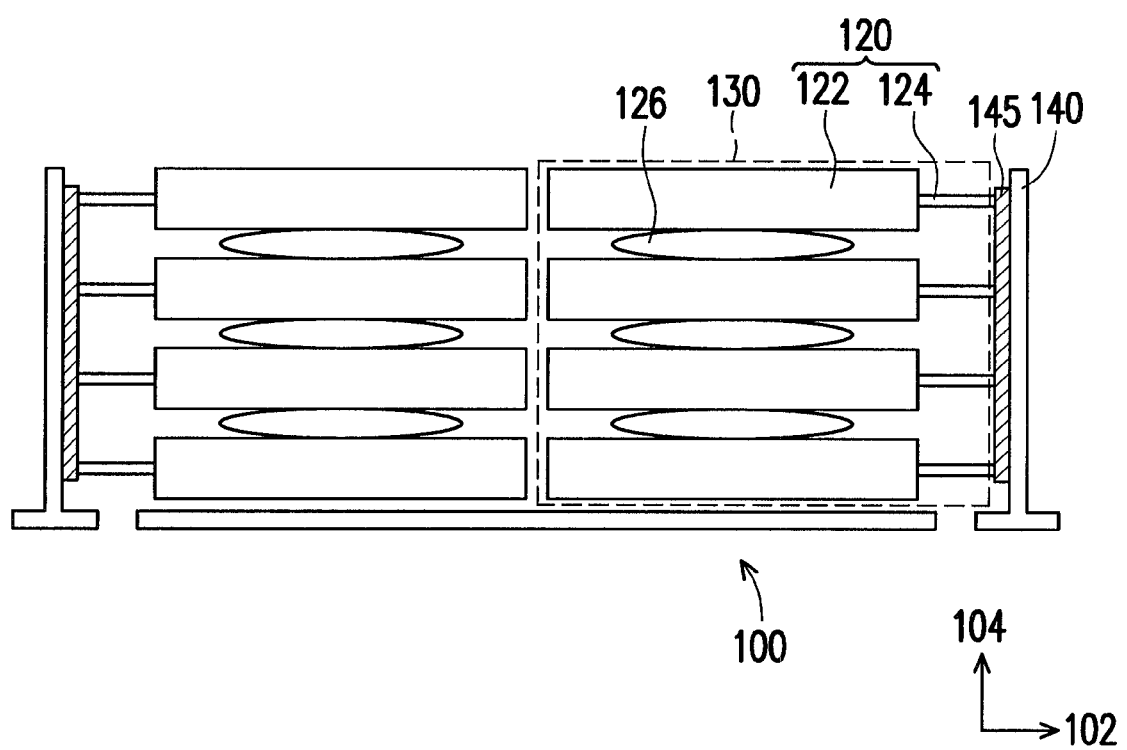
FIG. 1 is a cross-sectional view of a decoupling device according to an embodiment of the disclosure.

FIG. 1 is a cross-sectional view of a decoupling device according to an embodiment of the disclosure. Referring to FIG. 1, the decoupling device includes a lead frame 100 and M capacitor unit sets 130 (M=2 is taken as an example in FIG. 1, through M can also be an even number different to 2). The lead frame 100 has at least two three-dimensional anode side plates 140 bended along a second direction 104 and opposite to each other. The M (M=2) capacitor unit sets 130 are arranged on the lead frame 100 in parallel, and each of the capacitor unit sets 130 includes N capacitor units 120 (N=4 is taken as an example in FIG. 1, though the disclosure is not limited thereto). The N (N=4) capacitor units 120 are vertically stacked on the lead frame 100.

Each of the capacitor units 120 includes an anode portion 124 and a cathode portion 122. The cathode portions 122 are stacked and are electrically connected through a conductive adhesive 126. Each of the anode portions 124 is electrically connected to the corresponding anode side plate 140 through a conductive adhesive 145 in a first direction 102. In this way, each of the anode portions 124 is electrically connected to the corresponding anode side plate 140 in a vertical direction, which may greatly shorten a circuit transmission path to improve electron transport efficiency. Obviously, by using the anode side plates 140, the anode portions 124 can be electrically connected to each other without bending or pulling-down.

Figure 2A:
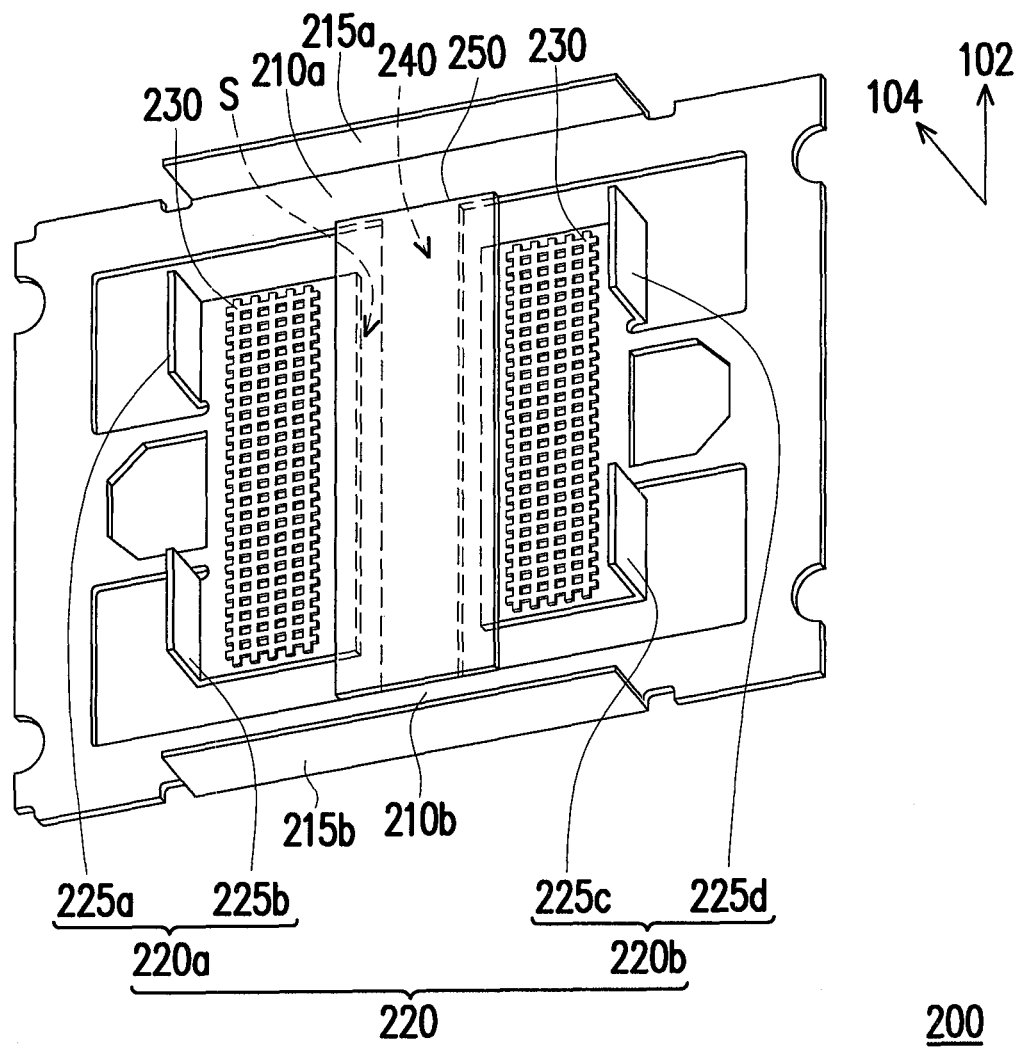
FIG. 2A and FIG. 2B are three-dimensional views of a front side and a backside of a lead frame according to a first exemplary embodiment of the disclosure.
Figure 2B:
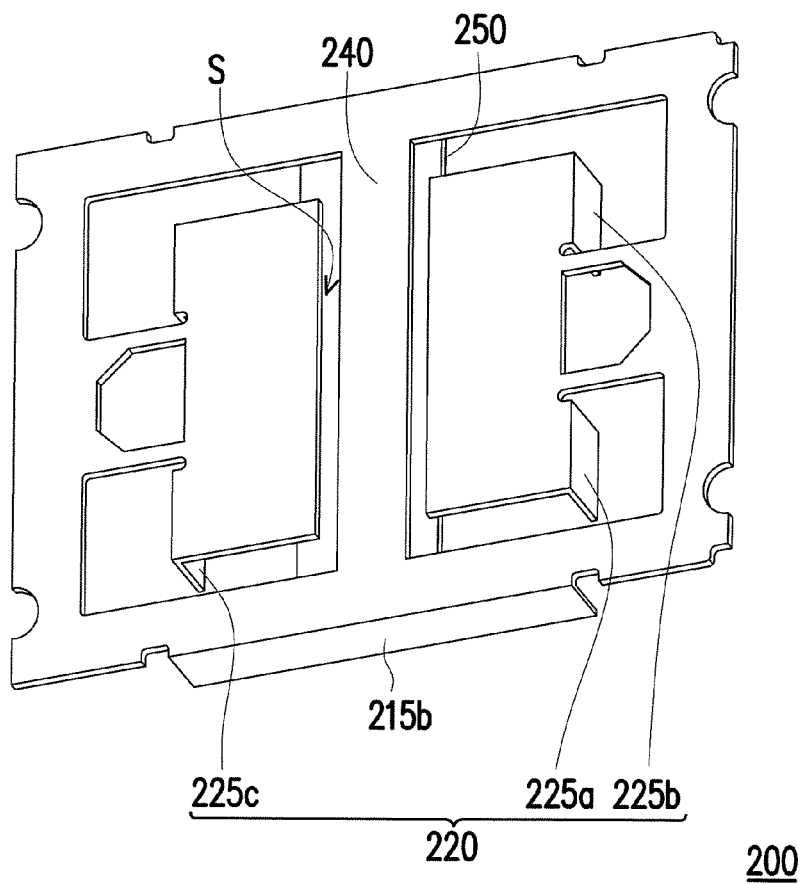

FIG. 2A and FIG. 2B are three-dimensional views of a front side and a backside of the lead frame according to a first exemplary embodiment of the disclosure. Referring to FIG. 2A and FIG. 2B, the lead frame 200 includes a conductive line 240, a cathode terminal portion 220 and at least two anode terminal portions 210a and 210b. The cathode terminal portion 220 has a space S. The conductive line 240 is disposed in the space S. The at least two anode terminal portions 210a and 210b are located at two sides of the cathode terminal portion 220 and opposite to each other, and are electrically connected to each other through the conductive line 240. The anode terminal portions 210a and 210b extend outwards along the first direction 102 to form extending portions, and the extending portions of the anode terminal portions are bended along the second direction 104 to form anode side plates 215a and 215b, where the first direction 102 is perpendicular to the second direction 104.

Referring to FIG. 2A and FIG. 2B, the space S can divide the cathode terminal portion 220 into two sub cathode terminal portions 220a and 220b, and the conductive line 240 is located in the space S between the two sub cathode terminal portions 220a and 220b. The two sub cathode terminal portions 220a and 220b respectively include at least one cathode side plate bended along the second direction 104. For example, as shown in FIG. 2A, the sub cathode terminal portion 220a includes two cathode side plates 225a and 225b, and the sub cathode terminal portion 220b includes two cathode side plates 225c and 225d.

Moreover, the cathode terminal portion 220 further includes a rough structure 230, which is disposed on a surface of the cathode terminal portion 220. The rough structure 230 may improve a bonding effect between the corresponding capacitor unit(s) and the cathode terminal portion 220. The rough structure 230 can be formed through a stamping or etching process performed on the cathode terminal portion 220. Moreover, the lead frame 200 further includes an insulation layer 250, which is disposed above the conductive line 240. By using the insulation layer 250, the cathode terminal portion 220 and the anode terminal portions 210a and 210b are electrically insulated to each other. Generally, the insulation layer 250 can be adhered on a suitable (predetermined) position of the lead frame 200 by using an insulation tape. Moreover, the cathode side plates 225a, 225b, 225c and 225d, the anode side plates 215a and 215b and the lead frame 200 are formed integrally, and are fabricated by using a same metal or an alloy material.

Figure 3:
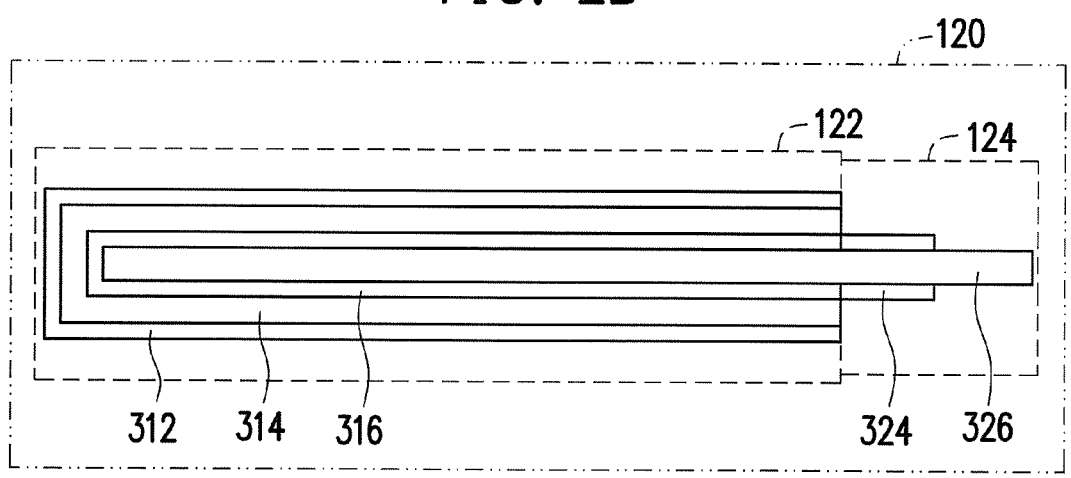
FIG. 3 is a cross-sectional view of a capacitor unit 120 of FIG. 1.

FIG. 3 is a cross-sectional view of the capacitor unit 120 of FIG. 1. Referring to FIG. 3, each of the capacitor units 120 is a sheet-like capacitor unit, and has the cathode portion 122 and the anode portion 124 at two opposite ends thereof. Each capacitor unit 120 may include a valve metal layer 326, a dielectric layer 316, a conductive polymer layer 314 and a cathode conductive layer 312. The dielectric layer 316 is formed on the valve metal layer 326. The conductive polymer layer 314 is formed on the dielectric layer 316. The cathode conductive layer 312 is formed on the conductive polymer layer 314.

A material of the valve metal layer 326 can be aluminium, tantalum, niobium, niobium oxide, titanium and a combination thereof. The dielectric layer 316 can be formed by coating a dielectric material on the valve metal layer 326. The dielectric layer 316 can also be a metal oxide formed through oxidation of the surface of the valve metal layer 326 subjected to a chemical anodic treatment.

Moreover, in each of the capacitor units 120, an insulation portion 324 can be disposed between the cathode portion 122 and the anode portion 124 for insulating the cathode portion 122 and the anode portion 124.

Figure 4A:
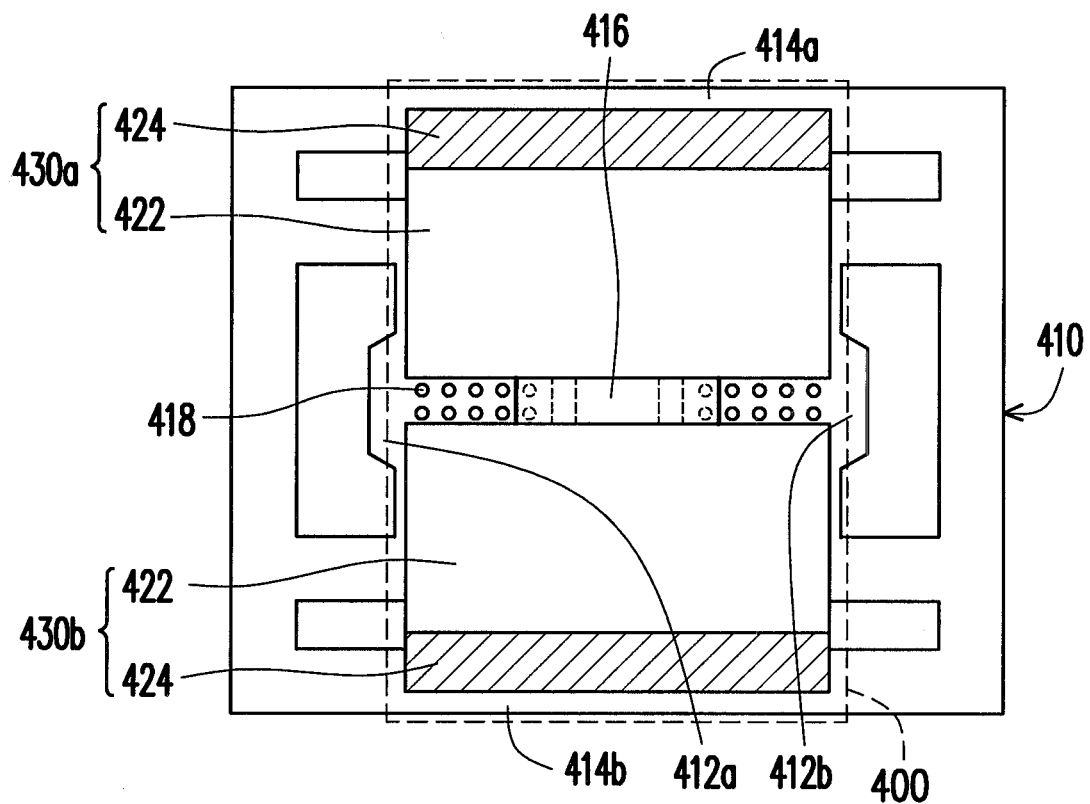
FIG. 4A and FIG. 4B are respectively schematic diagrams of a decoupling device and an equivalent circuit thereof according to a second exemplary embodiment of the disclosure.
Figure 4B:
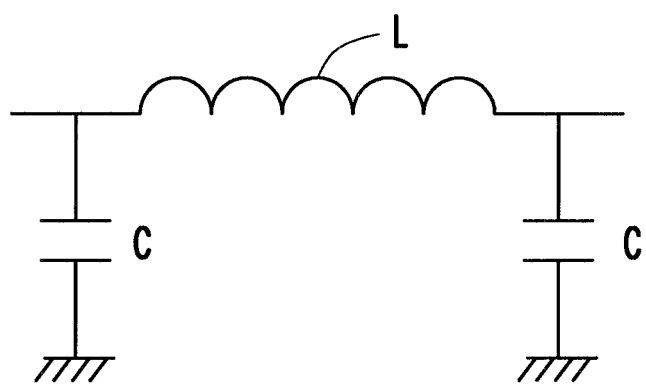

FIG. 4A and FIG. 4B are respectively schematic diagrams of a decoupling device and an equivalent circuit thereof according to a second exemplary embodiment of the disclosure. Referring to FIG. 4A, the decoupling device 400 includes two capacitor unit sets 430a and 430b, and the two capacitor unit sets 430a and 430b are disposed in parallel on a lead frame 410. The two capacitor unit sets 430a and 430b are respectively located at an upper part and a lower part of the drawing of FIG. 4A, and the respective cathode portions 422 are adjacent to each other, and the respective anode portions 424 are away from each other. In the embodiment, two sub cathode terminal portions 412a and 412b, at least two anode terminal portions 414a and 414b, and the rough structure 418 in FIG. 4A are similar to the described in FIG. 2A, 2B and, therefore, are not repeated herein.

As shown in the equivalent circuit diagram of FIG. 4B, a transmission line structure formed by the conductive line 416 may be formed as an equivalent inductor L under a high-frequency operation state, and the equivalent inductor L and the equivalent capacitors C of the two capacitor unit sets 430a and 430b may be formed a CLC circuit, which is the so-called π-type filter. In this way, electronic noise of the high-frequency operation can be effectively removed.

Figure 5:
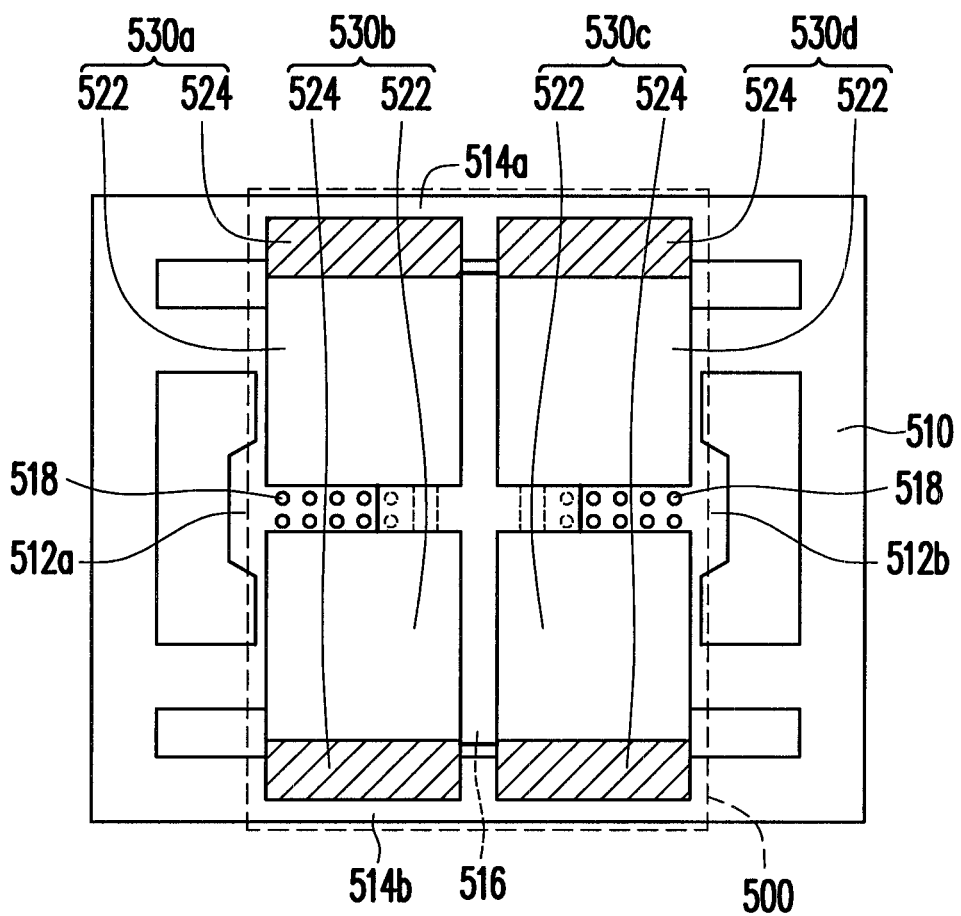
FIG. 5 is a schematic diagram of a decoupling device according to a third exemplary embodiment of the disclosure.

FIG. 5 is a schematic diagram of a decoupling device according to a third exemplary embodiment of the disclosure. Referring to FIG. 5, the decoupling device 500 includes four capacitor unit sets 530a, 530b, 530c and 530d. The four capacitor unit sets 530a, 530b, 530c and 530d are disposed on a same plane in parallel on a lead frame 510. The capacitor unit sets 530a and 530d are located at an upper part of the drawing of FIG. 5, and the capacitor unit sets 530b and 530c are located at a lower part of the drawing of FIG. 5, and the respective cathode portions 522 are adjacent to each other, and the respective anode portions 524 are away from each other. In the embodiment, two sub cathode terminal portions 512a and 512b, at least two anode terminal portions 514a and 514b, the conductive line 516, and the rough structure 518 in FIG. 5 are similar to the described in FIG. 2A, 2B and, therefore, are not repeated herein.

Figure 6A:
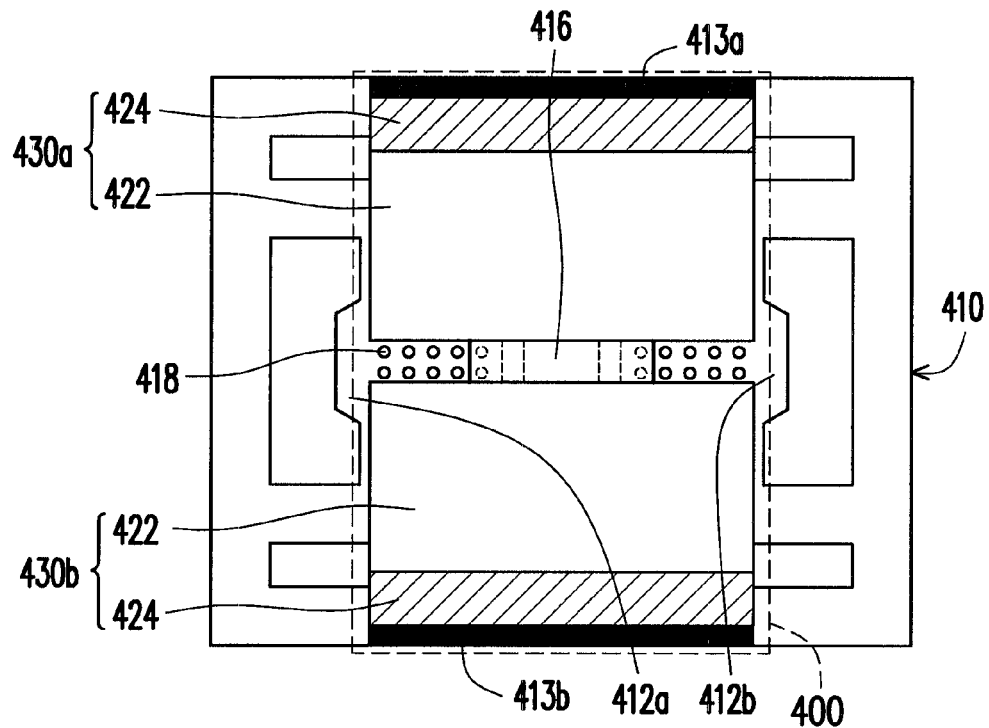
FIG. 6A is a schematic diagram of a decoupling device according to a fourth exemplary embodiment of the disclosure.

FIG. 6A is a schematic diagram of a decoupling device according to a fourth exemplary embodiment of the disclosure. Referring to FIG. 6A, the decoupling device 400 includes two capacitor unit sets 430a and 430b. The two capacitor unit sets 430a and 430b are disposed on a same plane in parallel on a lead frame 410. The two capacitor unit sets 430a and 430b are respectively located at an upper part and a lower part of the drawing of FIG. 6A, and the respective cathode portions 422 are adjacent to each other, and the respective anode portions 424 are away from each other. Anode side plates 413a and 413b of the lead frame 410 are respectively located on the upper part and the lower part of the drawing of FIG. 6A, and the anode portions 424 of the capacitor unit sets 430a and 430b are electrically connected to the anode side plates 413a and 413b, respectively.

Figure 6B:
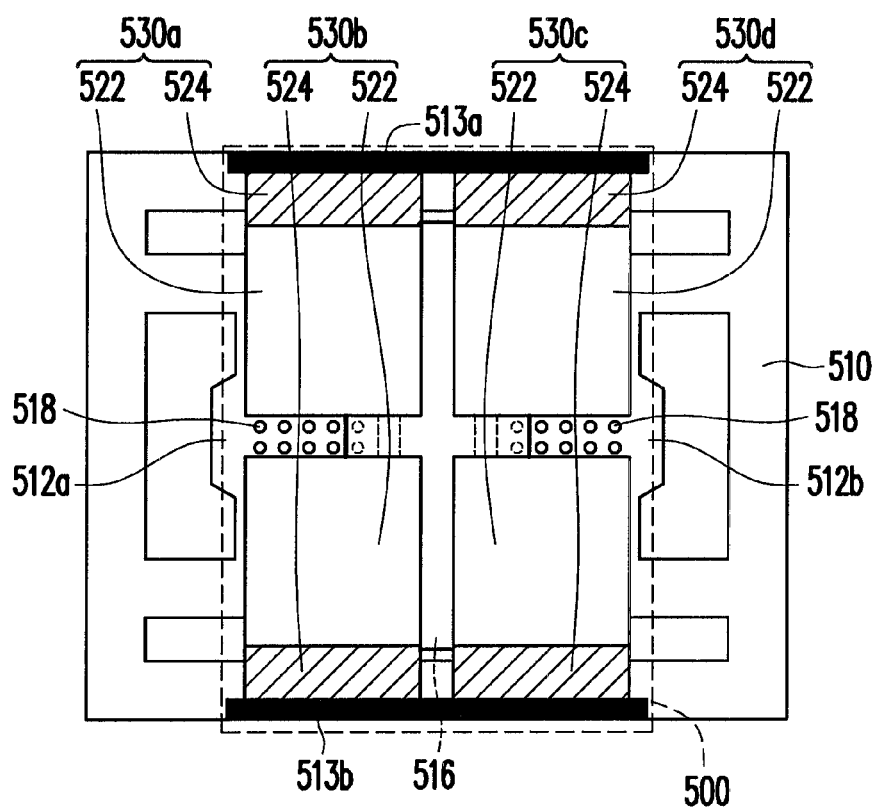
FIG. 6B is a schematic diagram of another decoupling device according to a fourth exemplary embodiment of the disclosure.

FIG. 6B is a schematic diagram of another decoupling device according to a fourth exemplary embodiment of the disclosure. Referring to FIG. 6B, the decoupling device 500 includes four capacitor unit sets 530a, 530b, 530c and 530d. The four capacitor unit sets 530a, 530b, 530c and 530d are disposed on a same plane in parallel on the lead frame 510. The capacitor unit sets 530a and 530d are located at an upper part of the drawing of FIG. 6B, and the capacitor unit sets 530b and 530c are located at a lower part of the drawing of FIG. 6B, and the respective cathode portions 522 are adjacent to each other, and the respective anode portions 524 are away from each other. An anode side plate 513a of the lead frame 510 is located at the upper part of the drawing of FIG. 6B, and an anode side plate 513b is located at the lower part of the drawing of FIG. 6B, the anode side plate 513a is electrically connected to the capacitor unit sets 530a and 530d, and the anode side plate 513b is electrically connected to the capacitor unit sets 530b and 530c.

Figure 6C:
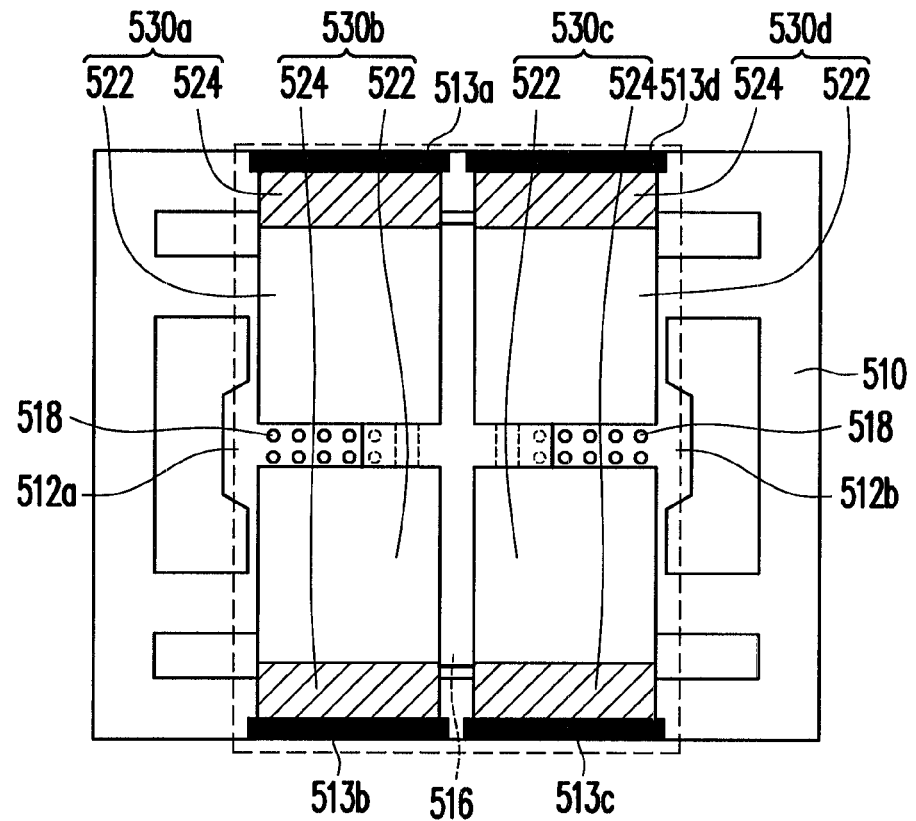
FIG. 6C is a schematic diagram of still another decoupling device according to the fourth exemplary embodiment of the disclosure.

FIG. 6C is a schematic diagram of still another decoupling device according to the fourth exemplary embodiment of the disclosure. Referring to FIG. 6C, the decoupling device 500 includes four capacitor unit sets 530a, 530b, 530c and 530d. The four capacitor unit sets 530a, 530b, 530c and 530d are disposed on a same plane in parallel on the lead frame 510. The capacitor unit sets 530a and 530d are located at an upper part of the drawing of FIG. 6C, and the capacitor unit sets 530b and 530c are located at a lower part of the drawing of FIG. 6C, and the respective cathode portions 522 are adjacent to each other, and the respective anode portions 524 are away from each other. Anode side plates 513a and 513d of the lead frame 510 are located at the upper part of the drawing of FIG. 6C, and anode side plates 513b and 513c are located at the lower part of the drawing of FIG. 6C. The anode side plates 513a and 513d are electrically connected to the capacitor unit sets 530a and 530d, respectively, and the anode side plates 513b and 513c are electrically connected to the capacitor unit sets 530b and 530c, respectively.

Figure 6D:
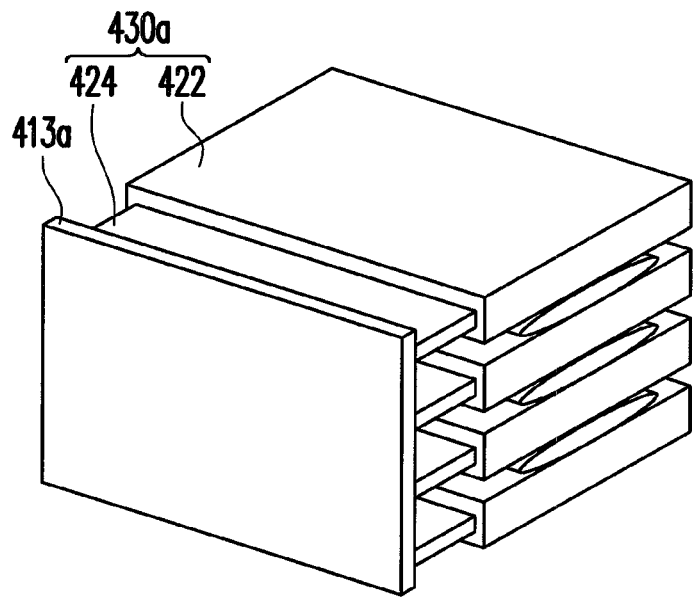
FIG. 6D is a three-dimensional view of the decoupling device of FIG. 6A.

FIG. 6D is a three-dimensional view of the decoupling device of FIG. 6A. In FIG. 6D, only the four-layer stacked capacitor units of the capacitor unit set 430a are illustrated, though the disclosure is not limited thereto. Referring to FIG. 6A and FIG. 6C, the anode portions 424 of the capacitor unit set 430a are perpendicularly and electrically connected to the anode side plate 413a, respectively.

Figure 7A:
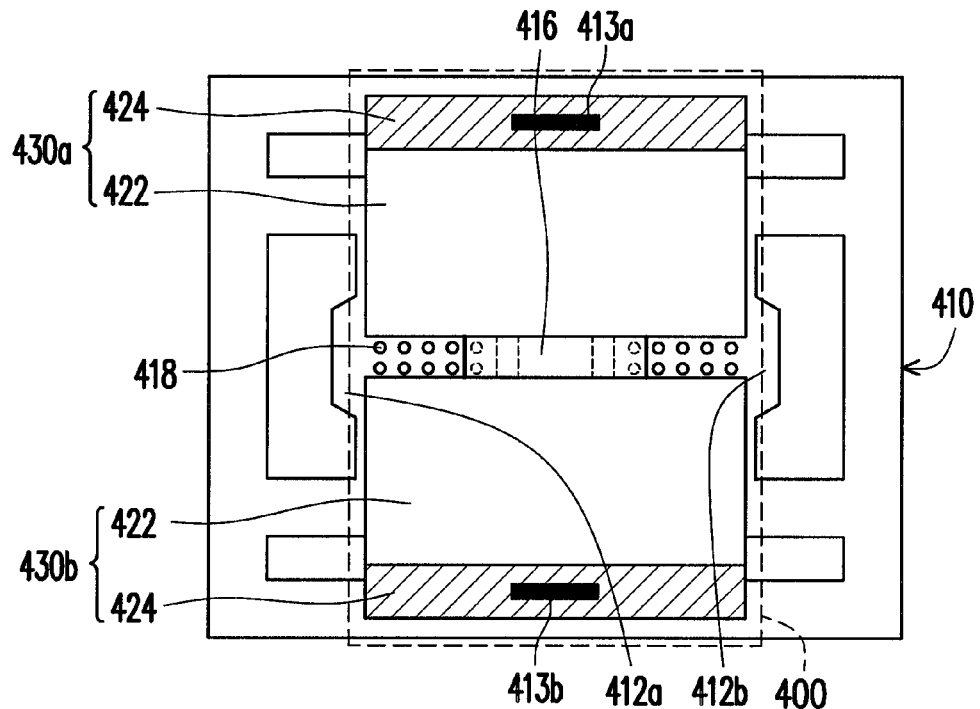
FIG. 7A is a schematic diagram of a decoupling device according to a fifth exemplary embodiment of the disclosure.

FIG. 7A is a schematic diagram of a decoupling device according to a fifth exemplary embodiment of the disclosure. Referring to FIG. 7A, the decoupling device 400 includes two capacitor unit sets 430a and 430b. The two capacitor unit sets 430a and 430b are disposed on a same plane in parallel on the lead frame 410. The two capacitor unit sets 430a and 430b are respectively located at an upper part and a lower part of the drawing of FIG. 7A, and the respective cathode portions 422 are adjacent to each other, and the respective anode portions 424 are away from each other. Anode side plates 413a and 413b of the lead frame 410 are respectively located at the upper part and the lower part of the drawing of FIG. 7A. The anode portions 424 of the capacitor unit sets 430a and 430b respectively sleeve the anode side plates 413a and 413b and are electrically connected thereto.

Figure 7B:
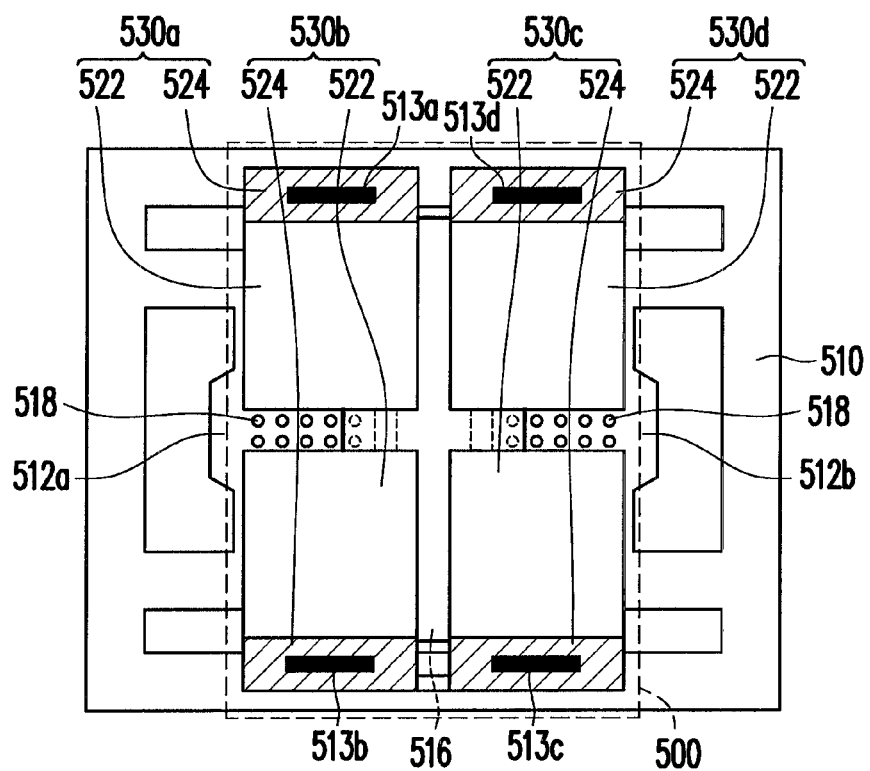
FIG. 7B is a schematic diagram of another decoupling device according to the fifth exemplary embodiment of the disclosure.

FIG. 7B is a schematic diagram of another decoupling device according to the fifth exemplary embodiment of the disclosure. Referring to FIG. 7B, the decoupling device 500 includes four capacitor unit sets 530a, 530b, 530c and 530d. The four capacitor unit sets 530a, 530b, 530c and 530d are disposed on a same plane in parallel on the lead frame 510. The capacitor unit sets 530a and 530d are located at an upper part of the drawing of FIG. 7B, and the capacitor unit sets 530b and 530c are located at a lower part of the drawing of FIG. 7B, and the respective cathode portions 522 are adjacent to each other, and the respective anode portions 524 are away from each other. Anode side plates 513a and 513d of the lead frame 510 are located at the upper part of the drawing of FIG. 7B, and anode side plates 513b and 513c are located at the lower part of the drawing of FIG. 7B. Anode portions 524 of the capacitor unit sets 530a and 530d respectively sleeve the anode side plates 513a and 513d and are electrically connected thereto, and anode portions 524 of the capacitor unit sets 530b and 530c respectively sleeve the anode side plates 513b and 513c and are electrically connected thereto.

Figure 7C:
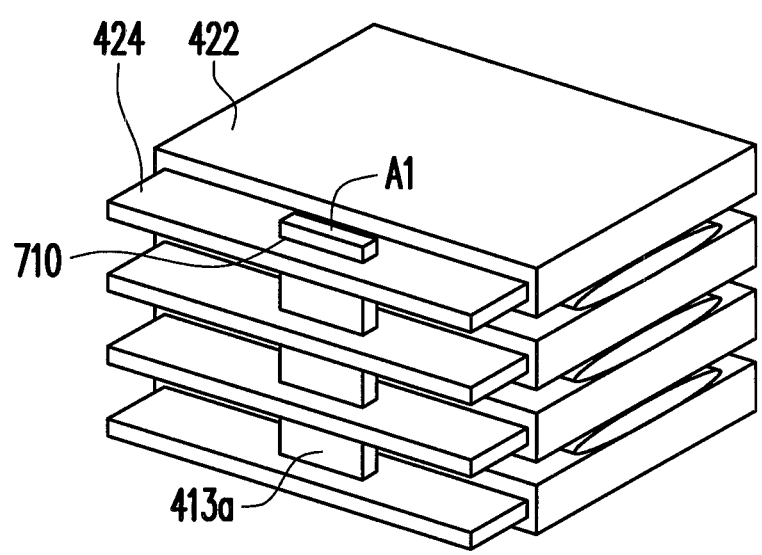
FIG. 7C is a three-dimensional view of the decoupling device of FIG. 7A.

FIG. 7C is a three-dimensional view of the decoupling device of FIG. 7A. In FIG. 7C, only the four-layer stacked capacitor units of the capacitor unit set 430a are illustrated, though the disclosure is not limited thereto. Referring to FIG. 7A and FIG. 7C, each of the anode portions 424 of the capacitor unit set 430a has a sleeve hole 710, which has an area the same to an area A1 of a top surface of the anode side plate 413a. The anode side plate 413a can be inserted into the sleeve hole 710 of each of the anode portions 424 to achieve an electrical connection effect.

Figure 8A:
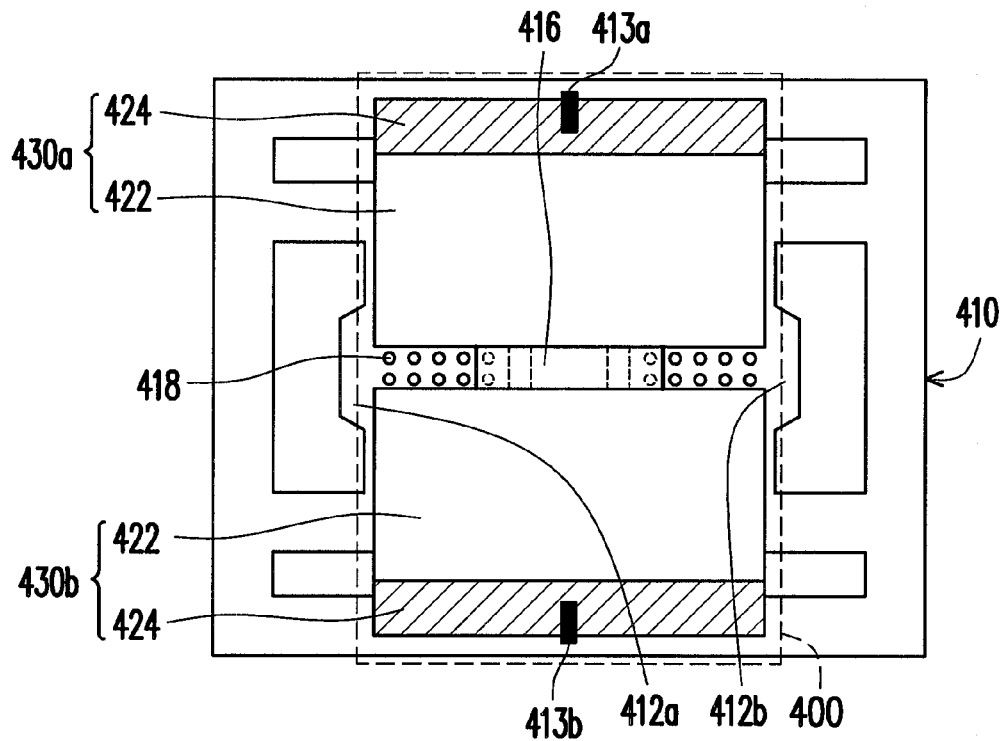
FIG. 8A is a schematic diagram of a decoupling device according to a sixth exemplary embodiment of the disclosure.

FIG. 8A is a schematic diagram of a decoupling device according to a sixth exemplary embodiment of the disclosure. Referring to FIG. 8A, the decoupling device 400 includes two capacitor unit sets 430a and 430b. The two capacitor unit sets 430a and 430b are disposed on a same plane in parallel on the lead frame 410. The two capacitor unit sets 430a and 430b are respectively located at an upper part and a lower part of the drawing of FIG. 8A, and the respective cathode portions 422 are adjacent to each other, and the respective anode portions 424 are away from each other. Anode side plates 413a and 413b of the lead frame 410 are respectively located at the upper part and the lower part of the drawing of FIG. 8A. The anode portions 424 of the capacitor unit sets 430a and 430b respectively penetrate through the anode side plates 413a and 413b and are electrically connected thereto.

Figure 8B:
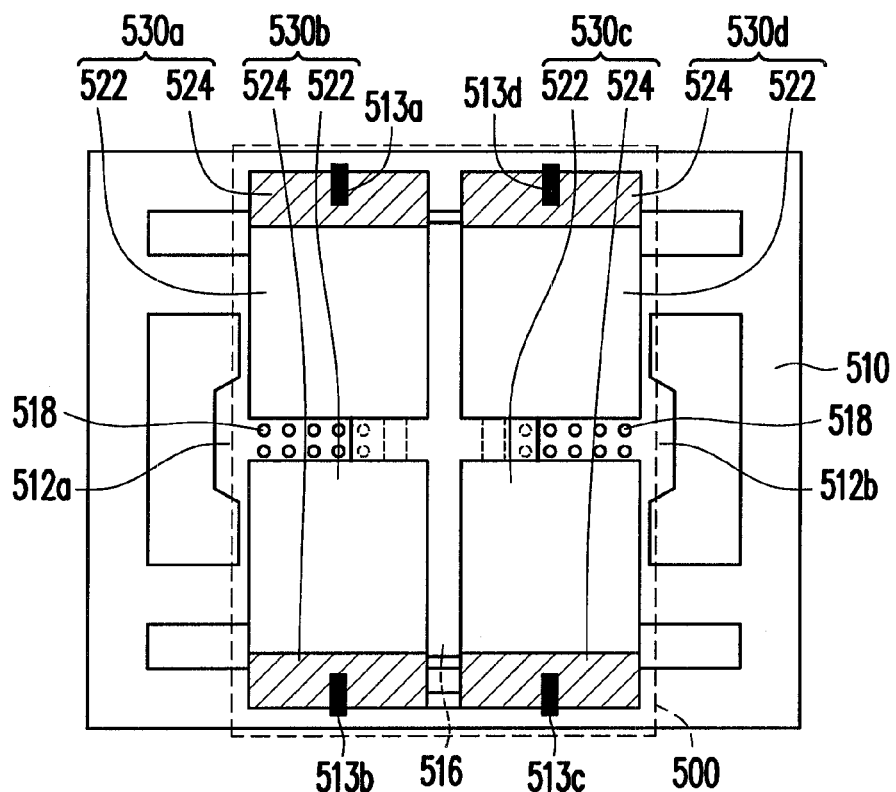
FIG. 8B is a schematic diagram of another decoupling device according to the sixth exemplary embodiment of the disclosure.

FIG. 8B is a schematic diagram of another decoupling device according to the sixth exemplary embodiment of the disclosure. Referring to FIG. 8B, the decoupling device 500 includes four capacitor unit sets 530a, 530b, 530c and 530d. The four capacitor unit sets 530a, 530b, 530c and 530d are disposed on a same plane in parallel on the lead frame 510. The capacitor unit sets 530a and 530d are located at an upper part of the drawing of FIG. 8B, and the capacitor unit sets 530b and 530c are located at a lower part of the drawing of FIG. 8B, and the respective cathode portions 522 are adjacent to each other, and the respective anode portions 524 are away from each other. Anode side plates 513a and 513d of the lead frame 510 are located at the upper part of the drawing of FIG. 8B, and anode side plates 513b and 513c are located at the lower part of the drawing of FIG. 8B. Anode portions 524 of the capacitor unit sets 530a and 530d respectively penetrate through the anode side plates 513a and 513d and are electrically connected thereto, and anode portions 524 of the capacitor unit sets 530b and 530c respectively penetrate through the anode side plates 513b and 513c and are electrically connected thereto.

Figure 8C:
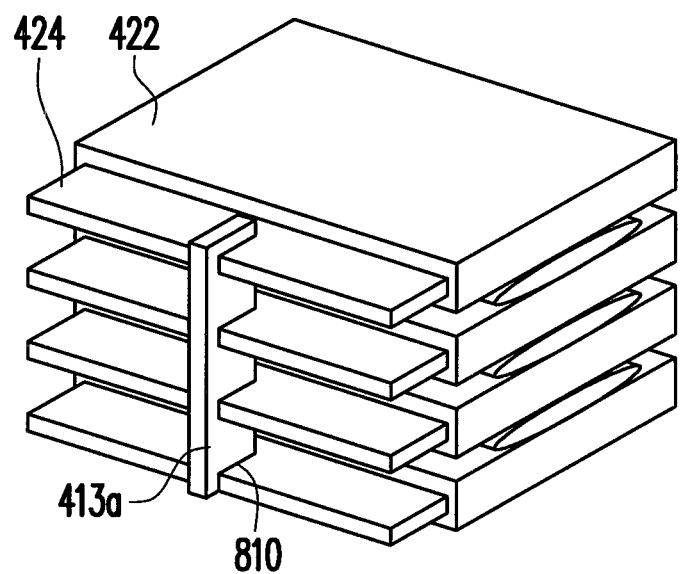
FIG. 8C is a three-dimensional view of the decoupling device of FIG. 8A.

FIG. 8C is a three-dimensional view of the decoupling device of FIG. 8A. In FIG. 8C, only the four-layer stacked capacitor units of the capacitor unit set 430a are illustrated, though the disclosure is not limited thereto. Referring to FIG. 8A and FIG. 8C, the anode side plate 413a has a through hole 810, and each of the anode portions 424 of the capacitor unit set 430a can be inserted to the through hole 810 to achieve an electrical connection effect.

Figure 9A:
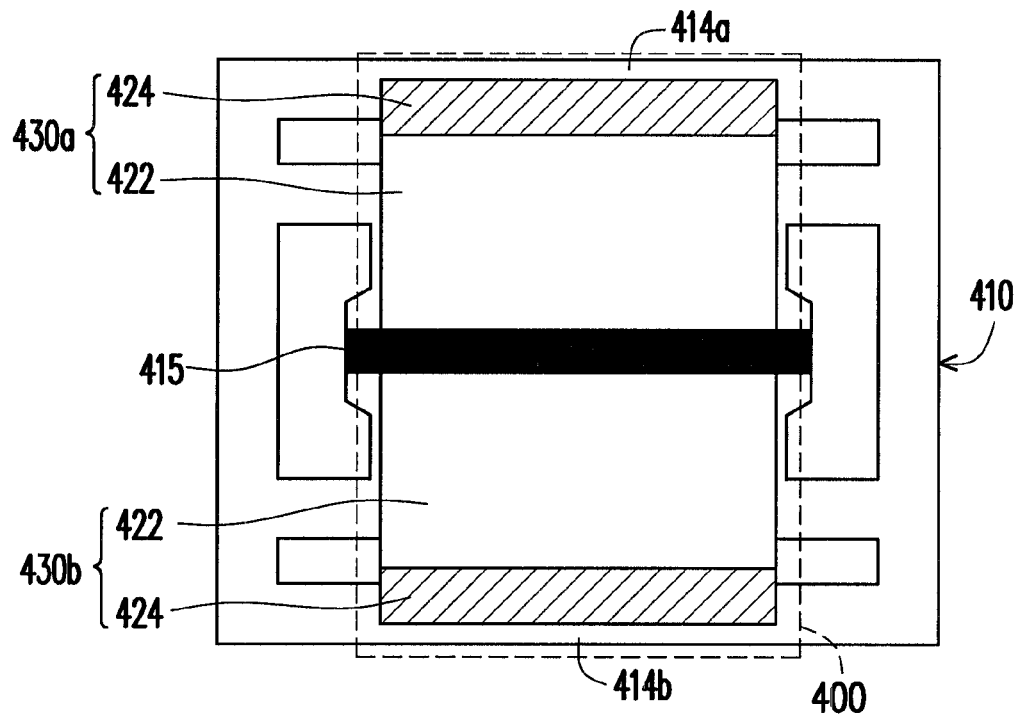
FIG. 9A is a schematic diagram of a decoupling device according to a seventh exemplary embodiment of the disclosure.

FIG. 9A is a schematic diagram of a decoupling device according to a seventh exemplary embodiment of the disclosure. Referring to FIG. 9A, the decoupling device 400 includes two capacitor unit sets 430a and 430b. The two capacitor unit sets 430a and 430b are disposed on a same plane in parallel on the lead frame 410. The two capacitor unit sets 430a and 430b are respectively located at an upper part and a lower part of the drawing of FIG. 9A, and the respective cathode portions 422 are adjacent to each other, and the respective anode portions 424 are away from each other. A cathode side plate 415 of the lead frame 410 is disposed between the cathode portions 422 of the two capacitor unit sets 430a and 430b of FIG. 9A, and the cathode side plate 415 is electrically connected to the cathode portions 422 of the capacitor unit sets 430a and 430b in a line-shape.

Figure 9B:
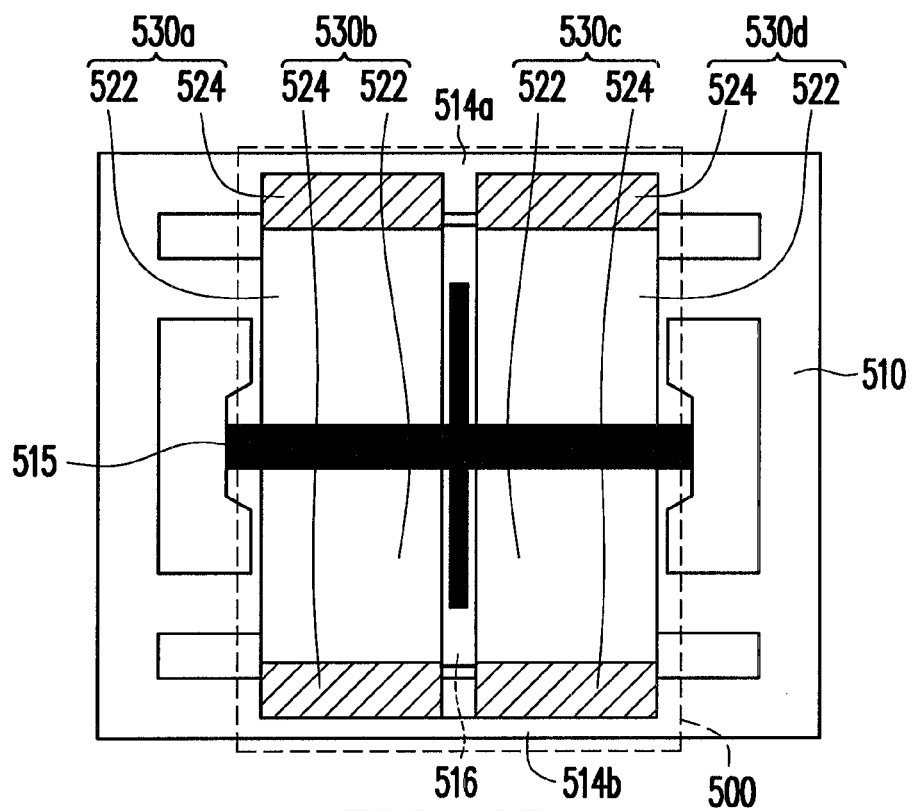
FIG. 9B is a schematic diagram of another decoupling device according to the seventh exemplary embodiment of the disclosure.

FIG. 9B is a schematic diagram of another decoupling device according to the seventh exemplary embodiment of the disclosure. Referring to FIG. 9B, the decoupling device 500 includes four capacitor unit sets 530a, 530b, 530c and 530d. The four capacitor unit sets 530a, 530b, 530c and 530d are disposed on a same plane in parallel on the lead frame 510. The capacitor unit sets 530a and 530d are located at an upper part of the drawing of FIG. 9B, and the capacitor unit sets 530b and 530c are located at a lower part of the drawing of FIG. 9B, and the respective cathode portions 522 are adjacent to each other, and the respective anode portions 524 are away from each other. A cathode side plate 515 of the lead frame 510 is disposed between the capacitor unit sets 530a, 530b, 530c and 530d as that shown in FIG. 9B, and the cathode side plate 515 is electrically connected to the cathode portions 522 of the capacitor unit sets 530a, 530b, 530c and 530d in a cross-shape.

Figure 9C:
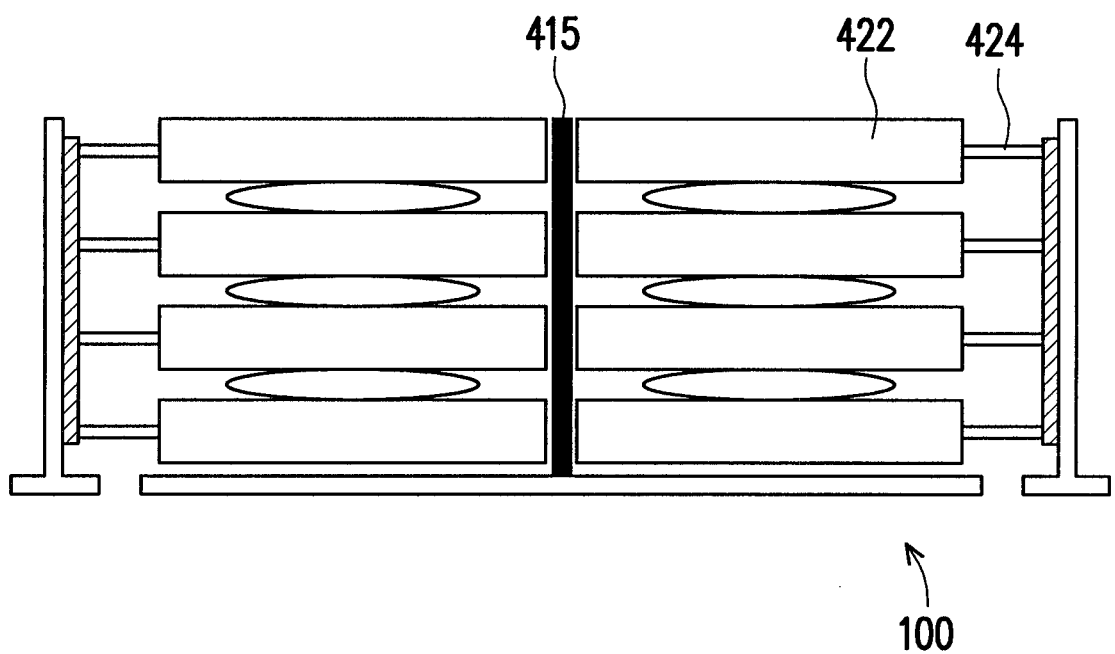
FIG. 9C is a side view of the decoupling device of FIG. 9A.

FIG. 9C is a side view of the decoupling device of FIG. 9A. In FIG. 9C, only the four-layer stacked capacitor units of the capacitor unit set 430a are illustrated, though the disclosure is not limited thereto. Referring to FIG. 9A and FIG. 9C, the cathode side plate 415 is disposed between the cathode portions 422 of the capacitor unit sets 430a and 430b, and is electrically connected to the cathode portions 422 of the capacitor unit sets 430a and 430b.

Figure 10A:
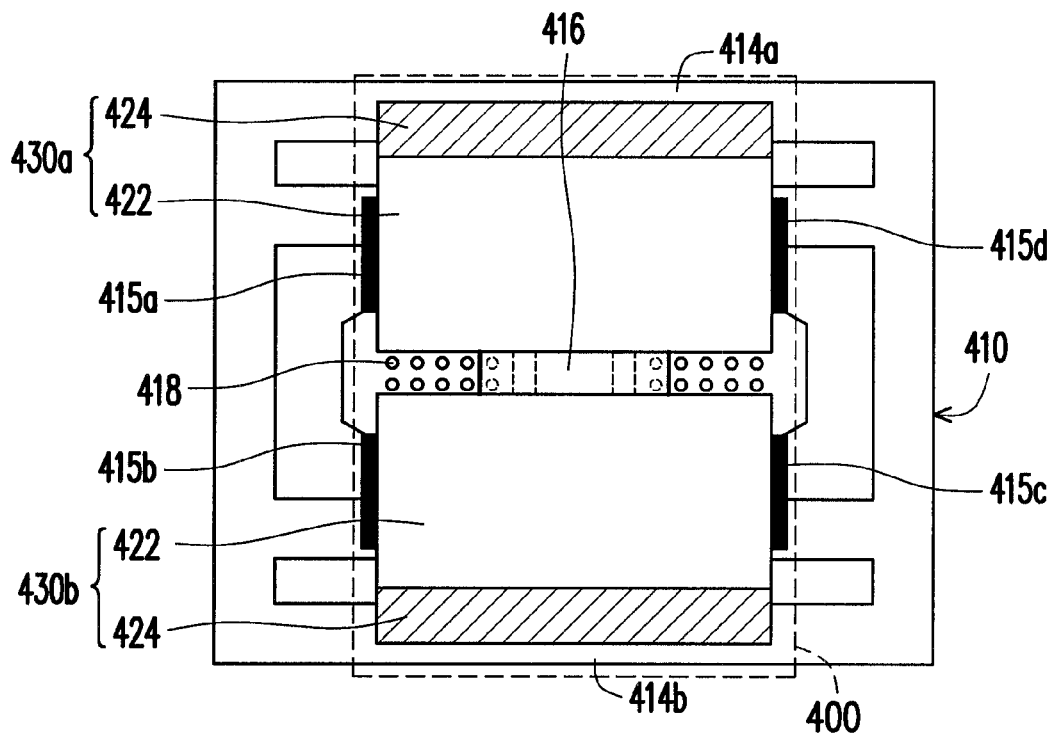
FIG. 10A is a schematic diagram of a decoupling device according to an eighth exemplary embodiment of the disclosure.

FIG. 10A is a schematic diagram of a decoupling device according to an eighth exemplary embodiment of the disclosure. Referring to FIG. 10A, the decoupling device 400 includes two capacitor unit sets 430a and 430b. The two capacitor unit sets 430a and 430b are disposed on a same plane in parallel on the lead frame 410. The two capacitor unit sets 430a and 430b are respectively located at an upper part and a lower part of the drawing of FIG. 10A, and the respective cathode portions 422 are adjacent to each other, and the respective anode portions 424 are away from each other. Cathode side plates 415a, 415b, 415c and 415d of the lead frame 410 are respectively disposed at two outer sides of the cathode portions 422 of the two capacitor unit sets 430a and 430b of FIG. 10A, and the cathode portions 422 of the capacitor unit sets 430a and 430b are electrically connected to the cathode side plates 415a, 415b, 415c and 415d.

Figure 10B:
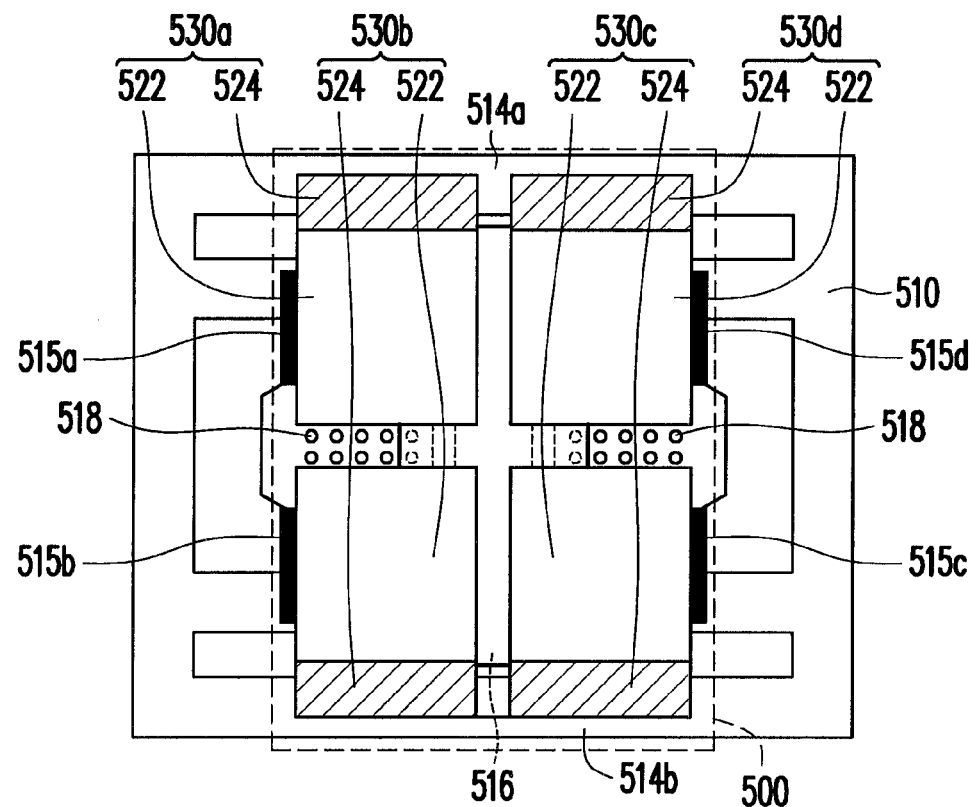
FIG. 10B is a schematic diagram of another decoupling device according to the eighth exemplary embodiment of the disclosure.

FIG. 10B is a schematic diagram of another decoupling device according to the eighth exemplary embodiment of the disclosure. Referring to FIG. 10B, the decoupling device 500 includes four capacitor unit sets 530a, 530b, 530c and 530d. The four capacitor unit sets 530a, 530b, 530c and 530d are disposed on a same plane in parallel on the lead frame 510. The capacitor unit sets 530a and 530d are located at an upper part of the drawing of FIG. 10B, and the capacitor unit sets 530b and 530c are located at a lower part of the drawing of FIG. 10B, and the respective cathode portions 522 are adjacent to each other, and the respective anode portions 524 are away from each other. Cathode side plates 515a, 515b, 515c and 515d of the lead frame 510 are respectively disposed at outer sides of the capacitor unit sets 530a, 530b, 530c and 530d as that shown in FIG. 10B, and the cathode portions 522 of the capacitor unit sets 530a, 530b, 530c and 530c1 are electrically connected to the cathode side plates 515a, 515b, 515c and 515d.

Figure 10C:
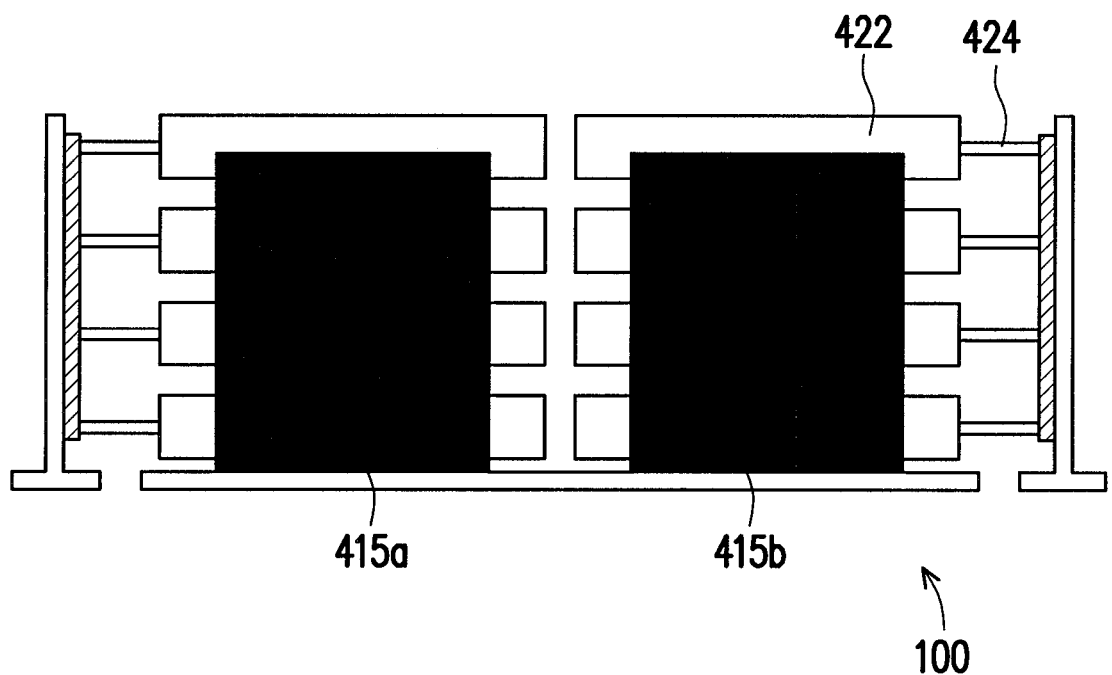
FIG. 10C is a side view of the decoupling device of FIG. 10A.

FIG. 10C is a side view of the decoupling device of FIG. 10A. In FIG. 10C, only the four-layer stacked capacitor units of the capacitor unit set 430a are illustrated, though the disclosure is not limited thereto. Referring to FIG. 10A and FIG. 10C, the cathode side plates 415a and 415b are disposed at two outer sides of the cathode portions 422 of the capacitor unit sets 430a and 430b, and are electrically connected to the cathode portions 422 of the capacitor unit sets 430a and 430b.

In summary, the decoupling device of the disclosure has at least following effects:

The decoupling device of the disclosure has a three-dimensional lead frame, in which cross-sections of the cathode and anode of the capacitor units are electrically connected to the side plates of the cathode and anode terminals of the lead frame, by which a process yield is increased, and circuit transmission paths are decreased. Meanwhile, the ESR is decreased, and the electron transport rate is increased.

Moreover, the transmission line structure is formed between the two anode portions of the decoupling device. The transmission line structure may produce an inductance during a high-frequency operation, and the inductance and the capacitance may form an equivalent filter circuit. In this way, the decoupling device further has a filter effect.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A decoupling device, comprising:
a lead frame, comprising a cathode terminal portion and at least two anode terminal portions disposed at two sides of the cathode terminal portion and opposite to each other, and the anode terminal portions being electrically connected to each other through a conductive line, wherein one of the anode terminal portions extends along a first direction to form an extending portion, and the extending portion of the anode terminal portion is bended along a second direction to form an anode side plate, wherein the first direction is perpendicular to the second direction, wherein the cathode terminal portion includes at least one sub cathode terminal portion, and the at least one sub cathode terminal portion, the anode side plates and the lead frame are foamed integrally; and
at least one capacitor unit set, comprising a plurality of capacitor units, wherein the capacitor unit sets are electrically connected to each other in parallel on a same plane and are disposed on the lead frame, and the capacitor units comprised in each of the capacitor unit sets are arranged along the second direction in a stacking manner, and each of the capacitor units has a cathode portion and an anode portion, the cathode portion is electrically connected to the cathode terminal portion, and the anode portion is electrically connected to the anode side plate along the first direction, wherein the at least one sub cathode terminal portion is disposed between the cathode portions of the adjacent capacitor units and is bended along the second direction to form a cathode side plate.

2. The decoupling device as claimed in claim 1, wherein the anode portions of the capacitor units are electrically connected to the anode side plate through a conductive adhesive or welding.

3. The decoupling device as claimed in claim 1, wherein the anode side plate of the lead frame further comprise at least one or more sheets of metal used for electrically connecting the anode portions of the capacitor units along the first direction.

4. The decoupling device as claimed in claim 1, wherein the anode portions of the capacitor units respectively comprise a sleeve hole used for electrically connecting the anode side plate along the second direction.

5. The decoupling device as claimed in claim 1, wherein the cathode terminal portion is electrically connected to the cathode portions in a line-shape or a cross-shape.

6. The decoupling device as claimed in claim 1, wherein the cathode portions of the capacitor units are connected to each other through a conductive adhesive and are stacked on the lead frame.

7. The decoupling device as claimed in claim 1, wherein the cathode terminal portion further comprises a rough structure disposed on a surface of the cathode terminal portion along the second direction.

8. The decoupling device as claimed in claim 1, wherein each of the capacitor units comprises:
a valve metal layer;
a dielectric layer, formed on the valve metal layer;
a conductive polymer layer, formed on the dielectric layer; and
a cathode conductive layer, formed on the conductive polymer layer.

9. The decoupling device as claimed in claim 8, wherein a material of the valve metal layer is selected from aluminium, tantalum, niobium, niobium oxide, titanium and a combination thereof.

10. The decoupling device as claimed in claim 8, wherein the dielectric layer is a metal oxide of the valve metal layer.

11. The decoupling device as claimed in claim 8, wherein the cathode conductive layer comprises a carbon adhesive layer and a silver adhesive layer.

12. The decoupling device as claimed in claim 1, further comprising an insulation layer disposed above the conductive line, wherein the cathode terminal portion and the anode terminal portions are insulated from each other through the insulation layer.

13. A three-dimensional lead frame, adapted to carry at least one capacitor unit set, comprising:
a cathode terminal portion, having a space;
a conductive line, disposed in the space; and
at least two anode terminal portions, disposed at two sides of the cathode terminal portion and opposite to each other, and electrically connected to each other through the conductive line, wherein one of the anode terminal portions extends outwards along a first direction to form an extending portion, and the extending portion of the anode terminal portion is bended along a second direction to form an anode side plate, and the first direction is perpendicular to the second direction, wherein the cathode terminal portion includes at least one sub cathode terminal portion, and the at least one sub cathode terminal portion, the anode side plates and the lead frame are formed integrally, wherein the at least one sub cathode terminal portion is disposed between the cathode portions of the adjacent capacitor units and is bended along the second direction to form a cathode side plate.

14. The three-dimensional lead frame as claimed in claim 13, wherein a material of the at least one cathode side plate is a metal or an alloy.

15. The three-dimensional lead frame as claimed in claim 13, wherein the cathode terminal portion has a rough structure on a surface along the second direction.

16. The three-dimensional lead frame as claimed in claim 13, wherein a material of the anode side plate is a metal or an alloy.

17. The three-dimensional lead frame as claimed in claim 13, further comprising an insulation layer disposed on a predetermined position, for electrically insulating the anode terminal portions and the cathode terminal portion.

18. A method for fabricating a decoupling device, comprising:

providing a lead frame comprising a cathode terminal portion and at least two anode terminal portions disposed at two sides of the cathode terminal portion and opposite to each other, the anode terminal portions being electrically connected to each other through a conductive line, wherein at least one of the anode terminal portions extends outwards along a first direction to form an extending portion, and the extending portion of the anode terminal portion is bended along a second direction to form an anode side plate, wherein the first direction is perpendicular to the second direction, wherein the cathode terminal portion includes at least one sub cathode terminal portion, and the at least one sub cathode terminal portion, the anode side plates and the lead frame are formed integrally; and providing at least one capacitor unit set comprising a plurality of capacitor units, wherein the capacitor unit sets are electrically connected to each other in parallel on a same plane and are disposed on the lead frame, the capacitor units comprised in each of the capacitor unit sets are arranged along the second direction in a stacking manner, and each of the capacitor units has a cathode portion and an anode portion, the cathode portion is electrically connected to the cathode terminal portion, and the anode portion is electrically connected to the anode side plate along the first direction, wherein the at least one sub cathode terminal portion is disposed between the cathode portions of the adjacent capacitor units and is bended along the second direction to form a cathode side plate.

* * * * *